United States Patent
Haake et al.

(10) Patent No.: US 7,601,267 B2
(45) Date of Patent: Oct. 13, 2009

(54) METHOD FOR POSITIONING SMALL PARTICLES IN A FLUID

(76) Inventors: Albrecht Haake, Oerlikonerstrasse 38, Zürich (CH) CH-8057; Jürg Dual, Waldegg 10a, Zumikon (CH) CH-8126

( * ) Notice: Subject to any disclaimer, the term of this patent is extended or adjusted under 35 U.S.C. 154(b) by 443 days.

(21) Appl. No.: 10/548,116

(22) PCT Filed: Sep. 25, 2003

(86) PCT No.: PCT/EP03/10649

§ 371 (c)(1),
(2), (4) Date: Oct. 3, 2005

(87) PCT Pub. No.: WO2004/079716

PCT Pub. Date: Sep. 16, 2004

(65) Prior Publication Data

US 2006/0049114 A1    Mar. 9, 2006

(30) Foreign Application Priority Data

Mar. 6, 2003    (EP)    ................... 03005039

(51) Int. Cl.
*C02F 1/32*    (2006.01)
*G01N 33/00*    (2006.01)

(52) U.S. Cl. .................. 210/748; 73/588; 210/600

(58) Field of Classification Search ................ 210/748, 210/600; 73/866, 588, 570.5; 134/1, 138; 436/518; 422/20
See application file for complete search history.

(56) References Cited

U.S. PATENT DOCUMENTS

| | | | |
|---|---|---|---|
| 4,983,189 A | | 1/1991 | Peterson et al. |
| 5,006,266 A | * | 4/1991 | Schram ....................... 210/748 |
| 5,085,783 A | * | 2/1992 | Feke et al. ................... 210/748 |
| 5,225,089 A | * | 7/1993 | Benes et al. ................. 210/748 |
| 5,831,166 A | * | 11/1998 | Kozuka et al. ................ 73/570 |
| 6,278,790 B1 | * | 8/2001 | Davis et al. ................. 381/398 |
| 6,764,860 B2 | * | 7/2004 | Lee ............................ 436/518 |
| 2002/0154571 A1 | | 10/2002 | Cefai et al. |

* cited by examiner

*Primary Examiner*—Walter D Griffin
*Assistant Examiner*—Cameron J Allen
(74) *Attorney, Agent, or Firm*—Laurence A. Greenberg; Werner H. Stemer; Ralph E. Locher

(57) ABSTRACT

The invention covers the field of positioning of small particles (58, 59) in a fluid (55). Disclosed is a method by which small particles (58, 59) are positioned by a sound field. For generating the sound field an apparatus contains a plate (51) excited to vibrations by a transducer (52) and a reflecting body with a rigid surface (54). A mounting (53) holds the vibrating plate (51) and the transducer (52). The particles will be concentrated at predetermined positions either at the rigid surface of the reflecting body (58) or levitating in the fluid (59). Due to the fact that the sound waves are emitted by the vibrating plate particles can be positioned in entire area between the vibrating plate and the reflecting body.

6 Claims, 8 Drawing Sheets

METHOD FOR POSITIONING SMALL PARTICLES IN A FLUID

BACKGROUND OF THE INVENTION

Field of the Invention

The invention is related to a method of non-contact separation, concentration, positioning and micromanipulation of small particles by acoustic forces in a fluid.

The handling of small particles is necessary in numerous fields, for instance in microtechnology for the assembly of components, in biotechnology for the manipulation of cells or in chemistry for dealing with small quantities of chemicals. However, in the sub-millimeter range arise many problems that do not occur or are unimportant in the larger scale: in the humidity of the normal atmosphere particles stick to the instruments due to capillary forces or components of a mechanism in sub-millimeter scale have structures on it which might be damaged when touched with conventional tweezers. This and similar problems can be avoided by using non-contact manipulation, where non-contact does not necessarily mean without contact to any material at all but without contact to solid instruments. As examples electrostatic manipulation or optical trapping shall be mentioned.

SUMMARY OF THE INVENTION

A major field where acoustical forces are used concerns acoustical filters. Two phases, where at least one is liquid or gaseous, are separated from each other. Usually a standing ultrasound wave is generated and particles are concentrated at certain locations in the standing wave depending on their material properties and outer forces. The frequency of the acoustical wave lies generally in the megahertz-range. To excite the ultrasound almost every application uses piezoelectric transducers in general driven at the resonance frequency. The European Patent Application EP 0 633 049 A1 introduces such a method using a stacked transducer consisting of a piezo-electric layer. When the particles are concentrated at predetermined positions they can be removed from the fluid. This can be achieved when the direction of the planes where the particles are collected and the direction of the flow of the cleared fluid are oblique to each other like described in the European Patent Application EP 0 380 194 A1. Another method introduces U.S. Pat. No. 4,983,189, where the particles are moved by using a beat frequency to excite the ultrasound.

Applications for acoustic filtering often get by with simple standing waves. However to use ultrasonic forces for manipulation or positioning of particles a more complicated sound field is required. It might be spatially two- or three-dimensional or its excitation might be amplitude- or phase-modulated. For example in the U.S. Pat. No. 4,736,815 an apparatus is described for levitating an object acoustically. The object is placed in a container whose length is changed accordingly to the excitation frequency. The disadvantage is that the object can only be positioned in this special container.

An apparatus with a two-dimensional ultrasound field in a fluid is introduced in the U.S. Pat. No. 5,006,266. Two one-dimensional ultrasound beams intersect each other with an arbitrary angle. The beams are formed either by one or two transducers per beam or by reflection of an ultrasound beam on a plane surface. Particles suspended in the fluid are concentrated at predetermined positions in the sound field. These positions can be changed either by displacing the liquid or by displacing the array of intersecting nodal fronts.

A modulated excitation of the ultrasound is explained in the European Patent Application EP 0 773 055 A2. In the fluid superposed ultrasound beams of different amplitudes, frequencies and phase are generated to produce an arbitrary-shaped spatial distribution of the potential energy. A plane surface with particles on it is placed in such an ultrasound beam parallel to its propagation direction. The spatial distribution of the potential energy has a rectangular shape. This shall force the particles to locations where the potential energy has its minima and arrange them in lines. However, the force acting on particles does not depend on the amplitude of the potential energy but on its gradient. Therefore a rectangular shaped energy distribution, as suggested in EP 0 773 055 A2, will only create a force field which is almost everywhere zero. It is only non-zero at this points where the rectangular energy distribution has a step.

In order to excite an ultrasound field capable to manipulate particles the inventors of U.S. Pat. Nos. 6,055,859 and 6,216,538 B1 use a plurality of ultrasound transducers, functioning independently of each other. The resulting sound field is a superposition of the sound field from each of the transducers. To form a sound field that traps and moves particles a complex control device is necessary. Each transducer needs its own excitation signal, differing in time, amplitude and wave form.

A method to trap a particle with two focused ultrasound beams was introduced by J. R. Wu ("Acoustical Tweezers", Journal of the Acoustical Society of America 1991; Vol. 89, Iss. 5, pp. 2140-2143). The ultrasound beams are generated by piezo shells. The particle can be moved by either tuning the frequency of the excitation or by moving the transducers.

The aim of the present invention is to provide a method for the micromanipulation of small particles, which allows separation, concentration or positioning of particles in one, two or three dimensions. Furthermore, an apparatus to carry out the method should be less complicated and the necessary control device can be simplified.

The present invention provides a method for positioning small particles.

Due to the method steps, that exciting said body to vibrations by a transducer;

reflecting said acoustic waves off of the surface of other bodies to form a sound field in which said acoustic forces appear;

the invention provides the emission of sound waves and the application of the said acoustical forces over a relatively large area in the fluid and allows a more precise separation, concentration or positioning of particles within the said fluid.

Further advantageous embodiments of the present invention are set out in the dependent claims.

In order to facilitate the understanding of the present invention, the following definitions are introduced:

i) A standing wave or stationary wave is a mechanical wave, whose amplitude of the characteristic property (e.g. displacement, pressure) is only a function of the spatial coordinates and is independent from time. The profile of the wave does not move through the medium; a standing wave has spatially fixed points where its amplitude is zero ("nodes") or maximal ("antinodes" or "loops"). A standing wave is the result of several superposed propagating waves.

ii) Sound or ultrasound is a mechanical propagating or standing longitudinal or transversal wave in a fluid or solid. Ultrasound is assumed to have a frequency of more than 20 kHz, but the described principle can also work below that frequency. The terms sound and ultrasound are used synonymously in this description.

iii) A fluid is any liquid or gaseous material.

iv) A particle is a solid body, liquid droplet, a cell or any cohesive material that is suspended in a fluid and has a specifiable border to the fluid. The particle has different material properties in respect to the fluid.
v) In this publication manipulation means an action that can be done with a particle in a fluid, like positioning, moving or separation from particle and fluid. Separation means to concentrate many particles in a way that the number of particles per volume element in the fluid is raised at predetermined positions.
vi) In this description an acoustic force (or radiation force) refers to the mean force that is acting on a particle in a sound field. Acoustic force does not mean forces due to viscosity, fluid flow or the like.
vii) A plate wave means a wave that propagates in a plate parallel to its surfaces. It is assumed that the wave length of the plate wave is not much smaller than the plate's thickness. A one-dimensional plate wave has a plane wave front and propagates in one direction. A two-dimensional plate wave is a superposition of two one-dimensional plate waves. The plate wave is similar to a Lamb wave, but the surfaces of the plate are not traction-free.

BRIEF DESCRIPTION OF THE DRAWING

FIG. 11a the vibrating plate is moved ore the fluid flows,
FIG. 11b the excitation frequency is changed,
FIG. 11c the plate vibration is modulated using two transducers.

DESCRIPTION OF THE PREFERRED EMBODIMENTS

Figure 1:
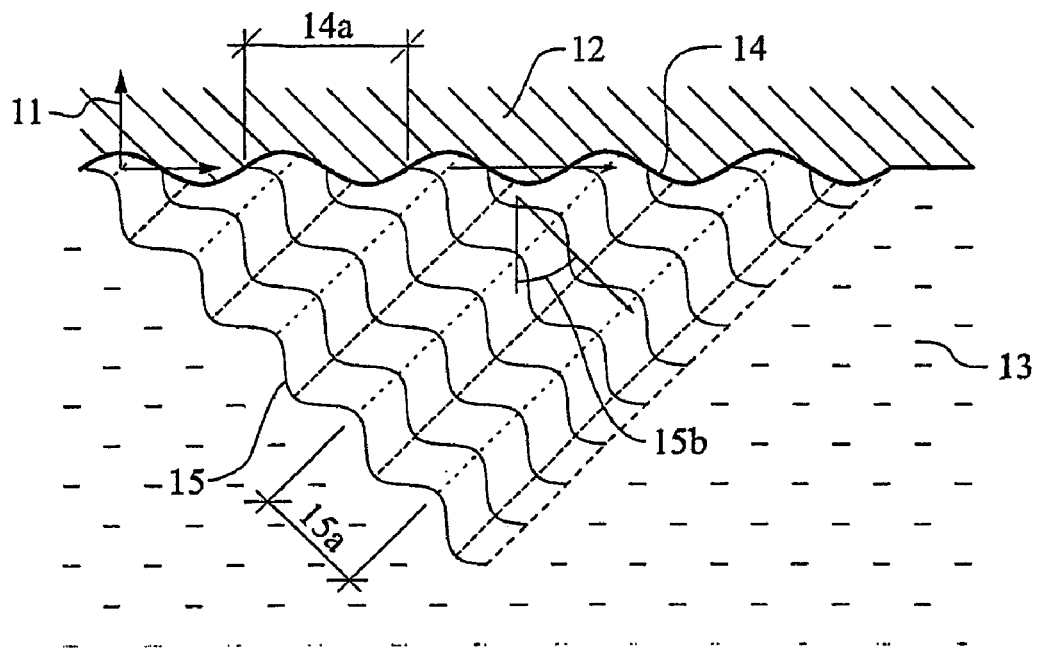
FIG. 1 shows the emission of a sound wave into a fluid by a propagating surface wave.

To be able to trap and move a particle in two or three dimensions in a designated manner an ultrasound field is necessary that is also two- or three-dimensional. The principles of the prior art mentioned above generate the required ultrasound field with considerable effort. It is therefore an object of the present invention to provide a method with which it is easily possible to excite an ultrasound field that is capable of trapping and positioning particles suspended in a fluid.

General explanation: The setup comprises a solid body (in the following called vibrating plate) that is mechanically excited in such a manner that at least one of its surfaces vibrates and emits sound waves into a fluid, another body (in the following called reflecting body) that is not excited on purpose to mechanical vibrations whose surface is placed opposite to the vibrating body to reflect the sound waves and the said fluid that fills the gap between these two bodies. A one-dimensional surface vibration (of a plate vibrating one-dimensionally) will produce a two dimensional sound field in the fluid and a two-dimensional surface vibration a three-dimensional sound field. Particles suspended in the fluid will be concentrated at predetermined positions in the fluid according to the distribution of the force potential in the fluid. It is possible to concentrate and to position particles that are in contact with the surface of the reflecting body or to let particles levitate freely at predetermined positions in the fluid. By changing the force potential in the fluid the particles change their position and can be moved. The particles must have material properties, such as density or speed of sound, that are generally different from the fluid; this condition is fulfilled for almost all material combinations of fluid and particle.

Excitation: The plate is excited to vibrations by a transducer and both are held by a mounting. It is also possible that the transducer is only in contact with the mounting that operates in this case as a wave guide and conducts mechanical vibrations between the transducer and the plate. The transducer may consist of a piezo-electric ceramics or a SAW-device (SAW means surface acoustic wave). The reflecting body, that is not externally excited, may be attached to the vibrating plate or the mounting or it may not be connected to it.

Excitation frequency: It is obvious that an excitation frequency which is close to the resonance frequency of the full apparatus, consisting of the vibrating plate, the fluid and the reflecting body, is most suitable. However the frequency must not fully coincident with the resonance frequency, it can even differ strongly. As an example it will be sufficient that the frequency is chosen to be accordant to the resonant frequency of the vibrating plate.

Functionality: With this invention particles surrounded by a fluid can be trapped at predetermined locations and than be positioned in this fluid. It is possible to move the particles in one or two dimensions parallel to the mentioned surfaces. The particles can be in contact with one of the surfaces or they can be trapped at predetermined positions between the two surfaces.

Advantages and comparison to other solutions: The advantage of this invention lies in the simplicity of the apparatus and the easy usability. Unlike most of the existing solutions the apparatus consists of a small number of components. As the operation of the apparatus is not very sensitive to the excitation frequency, a change in the resonance frequency, which could occur during the use, will not affect the usability.

In most cases, it will be therefore sufficient to run the apparatus with a single time-constant frequency. To manipulate particles on a surface the height of the fluid gap is not very important.

As it was mentioned above the reflecting body is not necessarily a part of the apparatus and in this case the invention consists only of the vibrating plate, a transducer and the mounting. This device can then be placed opposite to any surface on which particles shall be manipulated. This solves the problem that many inventions can only be run in a special environment.

Physical Basics: Early theoretical investigations on acoustical forces with good qualitative and quantitative agreement to later experiments were done by L. V. King in his publication on the forces on a rigid sphere in a sound field ("On the Acoustic Radiation Pressure on Spheres", Proceedings of the Royal Society of London. Series A, Mathematical and Physical Sciences 1934; Vol. 147, Iss. pp. 212-240) and later by K. Yosioka and Y. Kawasima who investigated the force on compressible spheres ("Acoustic Radiation Pressure on a Compressible Sphere", Acustica 1955; Vol. 5, Iss. pp. 167-173). Due to the limitations of the given formulas to plane sound waves we will refer to the publication of L. P. Gorkov ("Forces Acting on a Small Particle in an Acoustic Field within an Ideal Fluid", Doklady Akademii Nauk SSSR 1961; Vol. 140, Iss. 1, pp 88 et sqq.). The mean force <F> on a spherical particle in an arbitrary sound field is calculated from the potential of forces <U> as $$\langle F \rangle = -grad(\langle U \rangle) \text{ with}$$

$$\langle U \rangle = 2\pi r_S^3 \rho_F \left( \frac{1}{3} \frac{\langle p^2 \rangle}{\rho_F^2 c_F^2} f_1 - \frac{1}{2} \langle q^2 \rangle f_2 \right)$$

where
$r_S$ is the particles radius and assumed to be much smaller than the acoustical wavelength,
$<p^2>$ and $<q^2>$ are the mean square fluctuation of the pressure and velocity of the incident wave at the particles position,
$\rho_S$, $\rho_F$, $c_S$ and $c_F$ are the density and speed of sound of the particle and of the fluid, respectively, $$f_1 = 1 - (\rho_F c_F^2)/(\rho_S c_S^2) \text{ and}$$

$$f_2 = 2(\rho_S - \rho_F)/(2\rho_S + \rho_F).$$

Sound field and force distribution: FIG. 1 shows how an acoustical wave 15 is emitted to a fluid 13 by a surface wave 14 of a solid 12. The radiation angle 15b of the sound wave α can be calculated from $$\sin(\alpha) = \lambda_F / \lambda_{Sf}$$

where
$\lambda_{Sf}$ is the wavelength of the surface wave 14a and
$\lambda_F$ is the wavelength of the sound wave 15a given by the ratio of speed of sound in the fluid and frequency.

Figure 2:
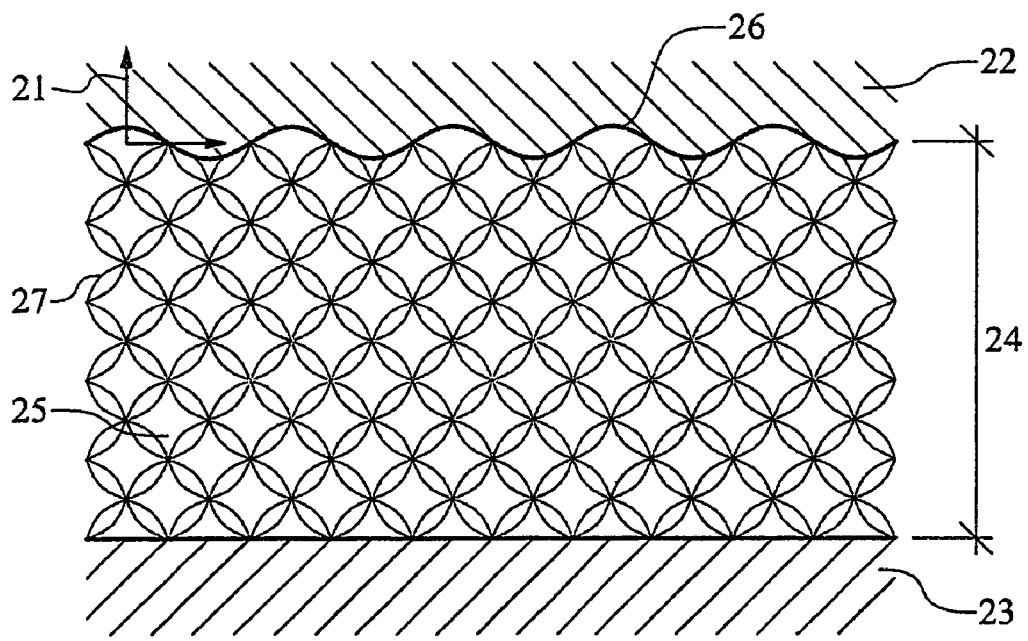
FIG. 2 shows a standing sound field generated by a standing surface wave and reflection.

A standing two-dimensional sound field 27 is schematically diagrammed in FIG. 2. A standing surface wave 26 emits two sound waves which are reflected on the surface of a body 23. The gap between the two surfaces is filled with a fluid 25 and has the height h 24. Using the given coordinate system 21, where the horizontal arrow indicates the x-direction and the vertical arrow the y-direction, the velocity potential φ can be given as $$\phi = \Phi_F \cos(x k_{Fx}) \sin(y k_{Fy}) e^{i\omega t}$$

where
$\Phi_F$ is its amplitude,
$\omega = 2\pi f$ is the angular frequency,
$k_{Fx}$ and $k_{Fy}$ are the horizontal and vertical components of the propagation vector of the acoustical wave in the fluid with $$k_{Fx}^2 + k_{Fy}^2 = (2\pi/\lambda_F)^2 \text{ and}$$

$$k_{Fx} = 2\pi/\lambda_{Sf},$$

t is the time and
x and y are the spatial coordinates.

As an example it shall be assumed that the height of the fluid layer h is three quarter of the vertical wave length in the fluid (FIG. 3), the vibrating surface is at y=0 and the reflecting surface at $$y = -h = -0.75 \lambda_{Fy}.$$

Figure 3:
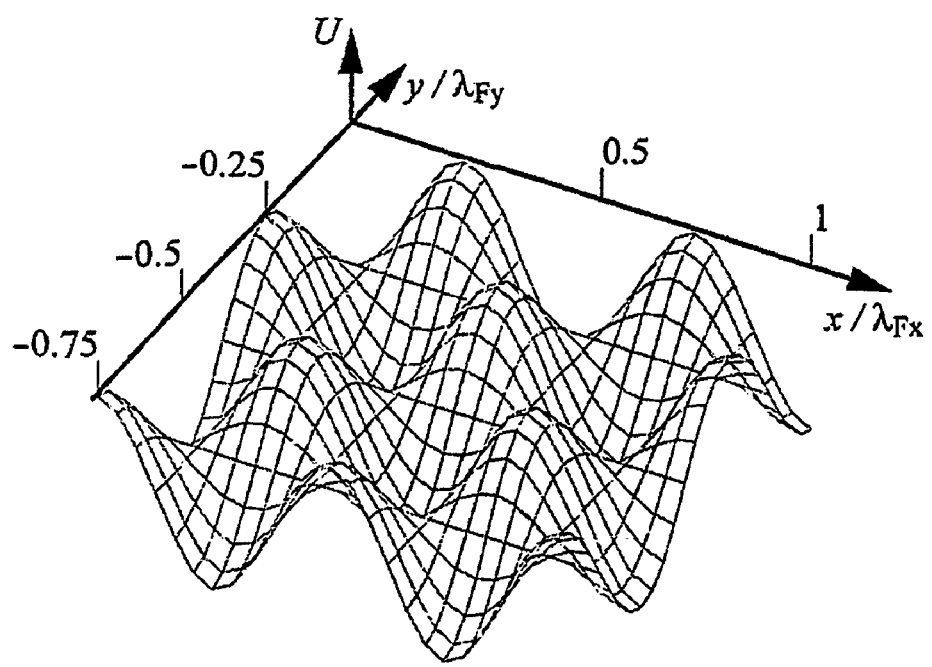
FIG. 3 shows the distribution of the force potential for a glass sphere in water with a spatially two-dimensional sound field.
Figure 4:
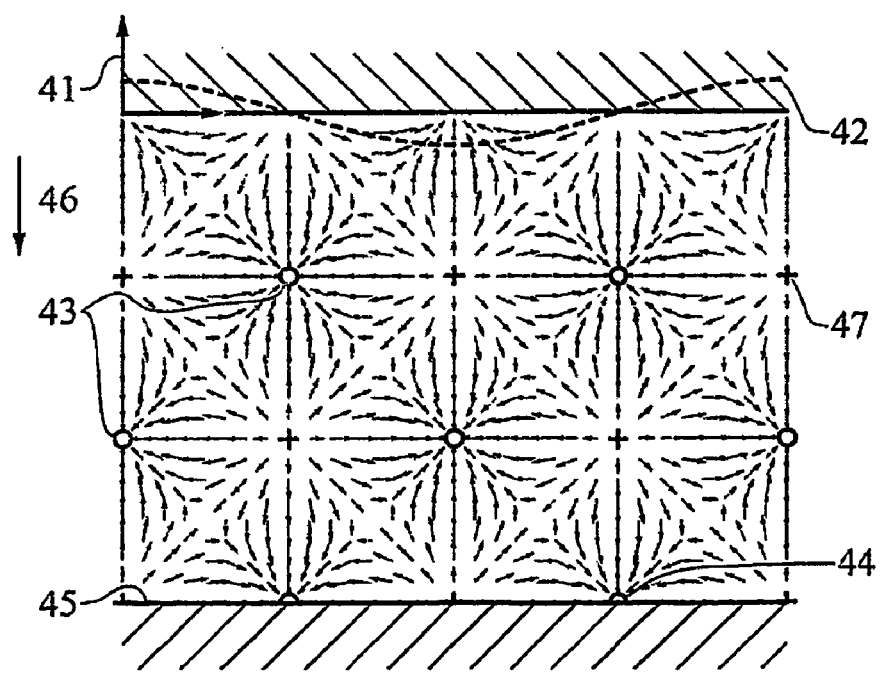
FIG. 4 shows the force distribution on a sphere according to the force potential shown in FIG. 3.

The force potential according to this example for a glass sphere in water is shown in FIG. 3 and the resulting force field in FIG. 4 where the vibration of the surface is illustrated with a dashed line 42. As it can be seen the force vectors are directed to the location where the force potential has its minimum. The equilibrium positions of suspended particles are marked with circles 43 or semi-circles 44. With an external force field like the terrestrial gravitation 46 the equilibrium position of levitating light particles will move a bit downwards; heavy particle have their equilibrium position only on the reflecting surface 45 at positions marked with semi-circles 44.

It is also possible to vary the distance h between the vibrating plate and the reflecting body (FIG. 2 distance 24). This can be done to change the amplitude of pressure and velocity in the fluid without changing the excitation signal.

In the previous description is was assumed that the fluid layer is coplanar, that means that the surface that emits the sound wave and the surface that reflects it are parallel to each other. However it is also possible to allow an angular deviation between these two surfaces so that the fluid is wedge shaped. For instance it is possible to change the position of the particles by changing this angle.

Figure 5A:
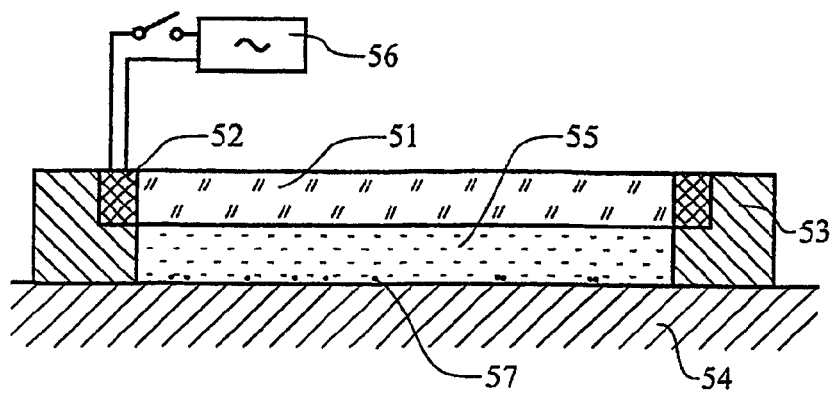
FIG. 5a and FIG. 5b show the preferred example of the apparatus, where in FIG. 5a the excitation is off.
Figure 5B:
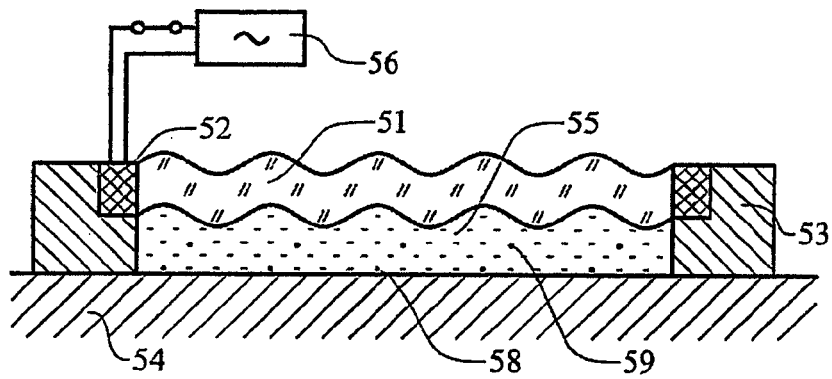

FIG. 5a is a schematic illustration of the full apparatus comprising a vibrating plate 51, a transducer 52 to excite the vibrating plate, a mounting 53 that holds the vibrating plate and the transducer, a reflecting body 54, a fluid 55 that fills the space between the plate and the body and generator 56 to run the transducer 52. The particles 57 are distributed arbitrarily when the power supply 56 is turned off. When the transducer 52 is excited and the plate 51 performs vibrations as shown in FIG. 5b the particles 58, 59 will be concentrated at predetermined positions either at the lower surface 58 or levitating in the fluid 59.

Excitation of the vibrations: Depending on whether the particles shall be positioned in one or two directions the vibrating plate 51, 61 has to be excited to one- or two-dimensional vibrations. In this case one- or two-dimensional vibrations means that in the plate standing or propagating waves appear in one or two directions. (The movement of the plate itself is then two- or three-dimensional.)

Figure 6A:
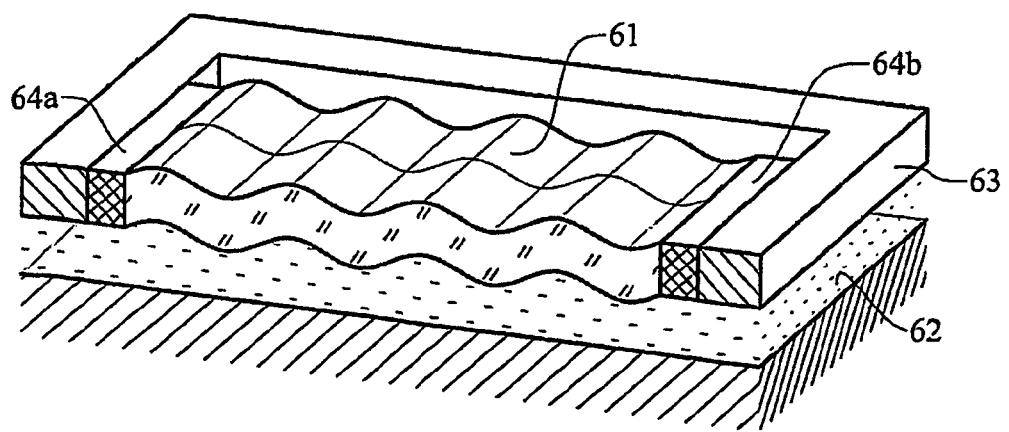
FIG. 6a shows an arrangement of the vibrating plate, the transducer and the mounting for the excitation of a one-dimensional plate wave. The plate is drawn performing vibrations.

In FIG. 6a a possible arrangement for a one-dimensional excitation comprising the vibrating plate 61, the transducers 64a, 64b and the mounting 63 is displayed. The vibrating plate 61 is drawn performing vibrations. This example comprises two transducers 64a and 64b, however only one transducer e.g. 64a is necessary to excite a vibration.

Figure 6B:
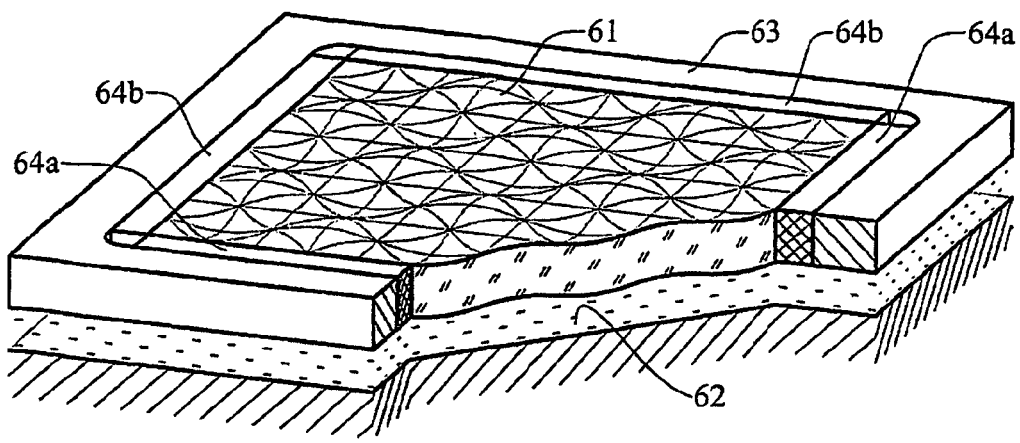
FIG. 6b shows an arrangement of the vibrating plate, the transducer and the mounting for the excitation of two perpendicular standing plate waves. The plate is drawn performing vibrations.
Figure 6C:
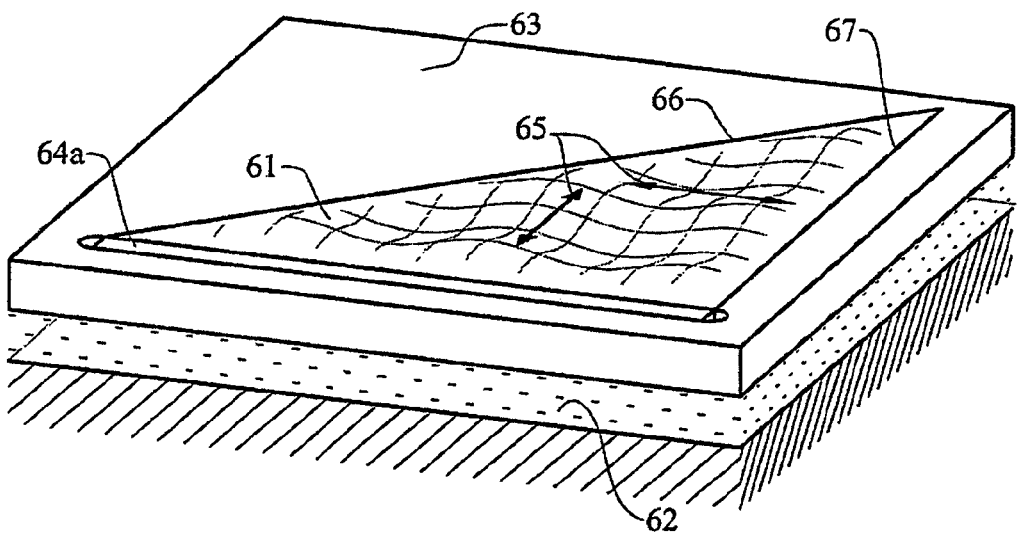
FIG. 6c shows an arrangement to excite a two-dimensional vibration in the plate with only one transducer.

The vibrating plate 61 in FIG. 6b is excited to two-dimensional vibrations. For each dimension of the vibration at least one transducer 64a or 64b is necessary; in the drawing two transducers per excited dimension are displayed. A method to excite a two-dimensional vibration with one transducer 64*a* is given in FIG. 6*c*. In this case the vibrating plate 61 has a triangular shape. The wave 65 excited by the single transducer 64*a* propagates and is reflected by two edges 66 and 67 of the plate 61.

Figure 7:
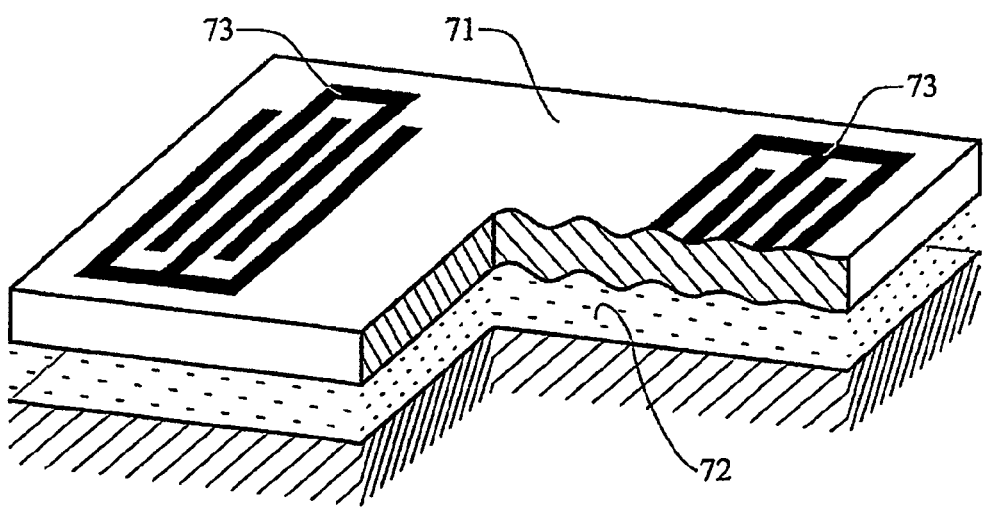
FIG. 7 shows the excitation of the vibration with a SAW device. The plate is drawn performing vibrations.

The mentioned transducers may be made of piezoelectric material. Another possibility is shown in FIG. 7 where the vibrations are excited with something like a SAW-device 73.

Figure 8A:
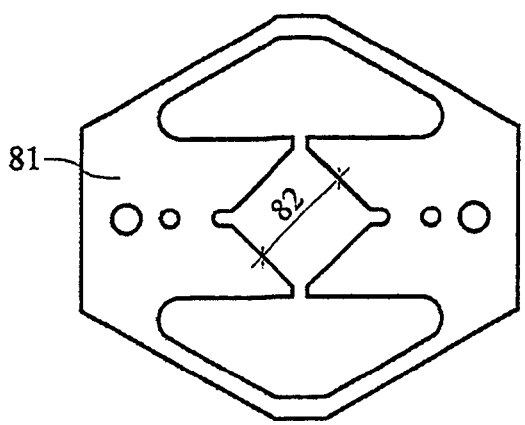
FIG. 8a and FIG. 8b show the preferred example of the mounting and a method to assemble the vibrating plate, the transducers and the mounting.
Figure 8B:
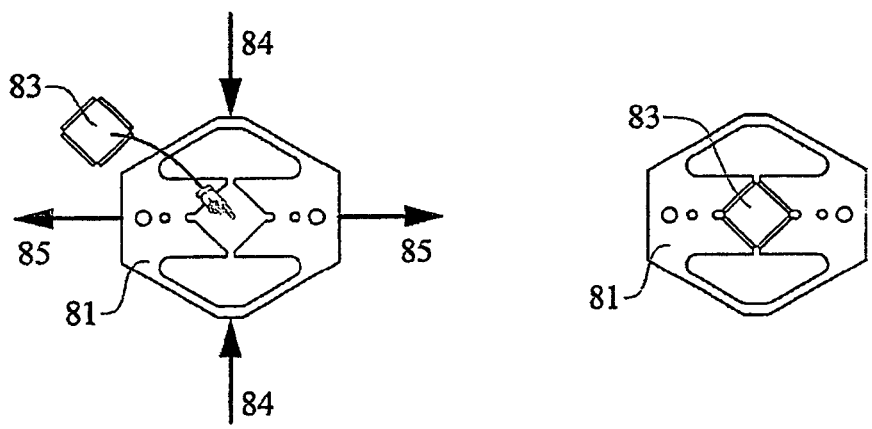

Mounting: A device 81 and method to hold the vibrating plate and the transducer is shown in FIG. 8*a* and FIG. 8*b*. The quadratic recess 82 is a bit smaller than the outer dimensions of vibrating plate with the transducers 83. An applied displacement 84 causes an elongation 85 of the device 81. This causes the quadratic recess to become a bit lager. After that the vibrating plate with the transducers 83 is placed in the recess. When the displacement 84 is released the plate will be held tightly. This process is shown in the left part of FIG. 8*b* and in the right part the fully assembled device is shown.

Figure 9:
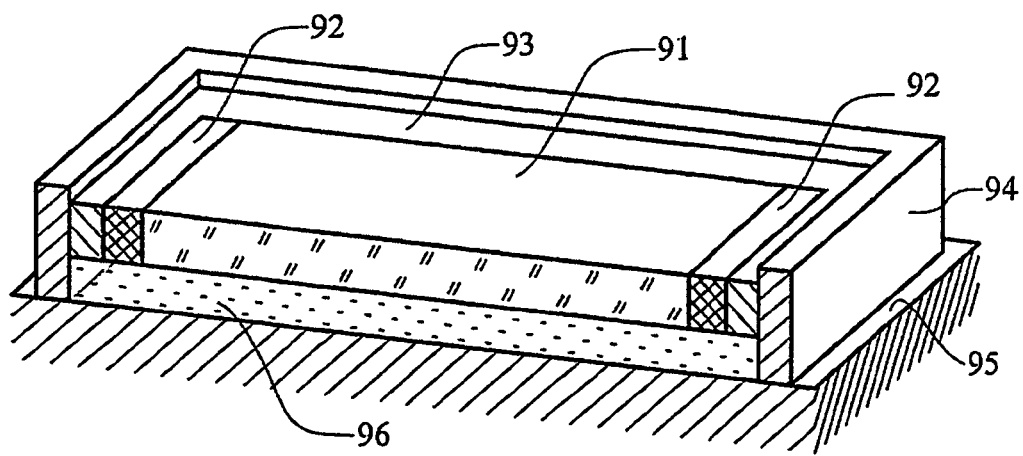
FIG. 9 shows an example of the apparatus, where the mounting of the vibrating plate is attached to the reflecting surface.

Referring to FIG. 9 the first preferred embodiment comprises a plate 91, at least one transducer 92 to excite the plate 91 mechanically, a mounting 93 that holds the plate 91 and the transducer 92, a reflecting body with a rigid surface 95, a means 94 to hold the mounting and to move it relatively to the reflecting body 95, a fluid 96 that fills the gap between the plate and the reflecting body 95 and a generator (not drawn) to run the transducer(s). The mounting 93 with the plate 91 and the transducer(s) 92 can be positioned in all directions relative to the reflecting body.

Figure 10:
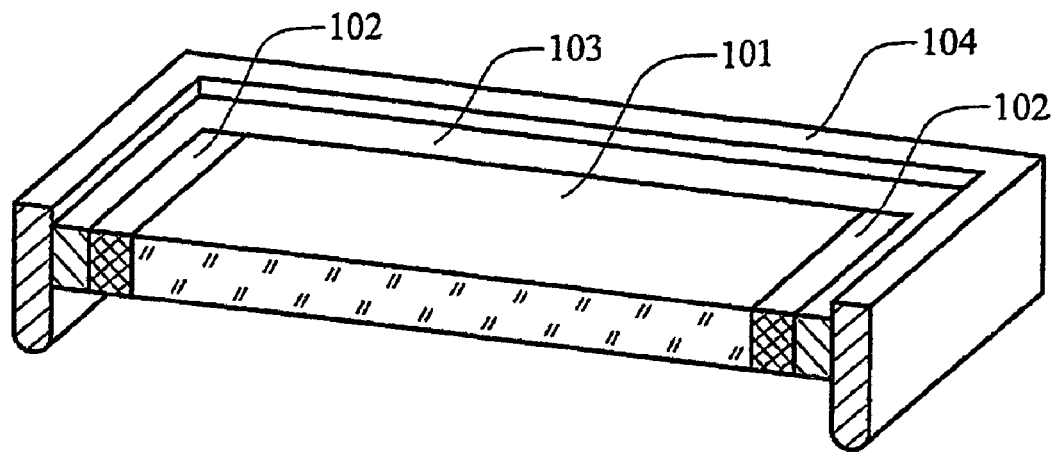
FIG. 10 shows an example of the apparatus, where the vibrating plate and mounting are not connected to the reflecting surface.

FIG. 10 shows the second preferred embodiment consisting of a plate 101, at least one transducer 102 to excite this plate 101 mechanically, a mounting 103 that holds the plate 101 and the transducer 102 and a generator (not drawn) to run the transducer(s) 102. This apparatus can be placed on any rigid surface to position particles on this surface.

Figure 11A:
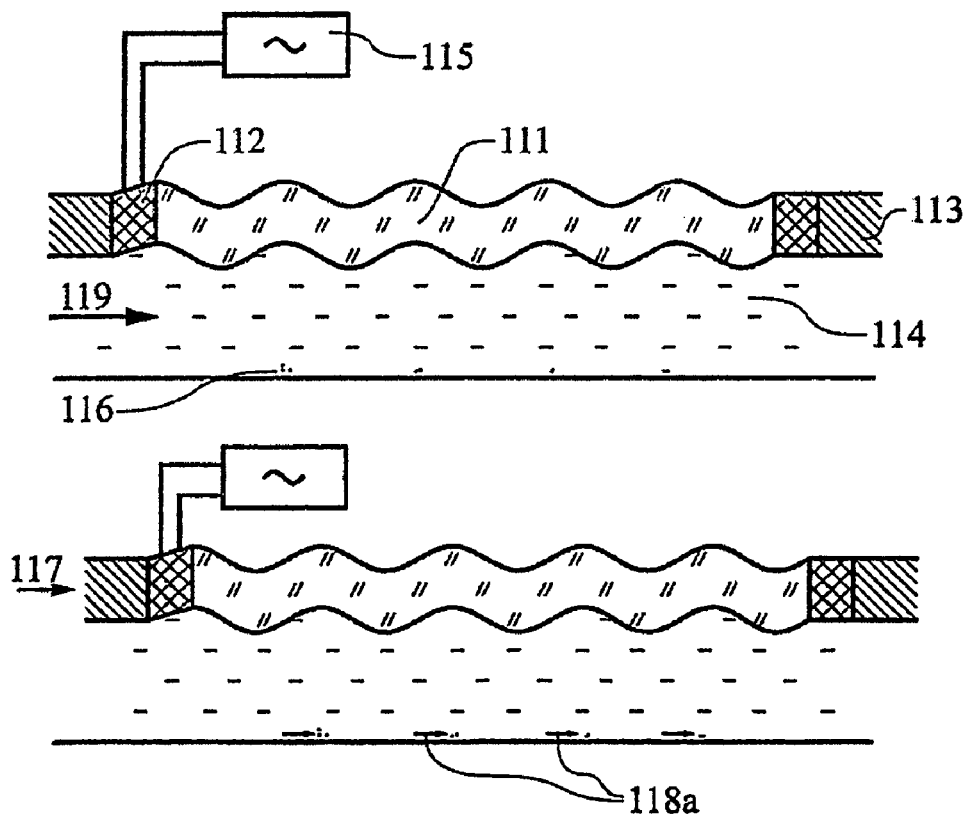
FIG. 11a, FIG. 11b and FIG. 11c show methods to move particles, in particular.
Figure 11B:
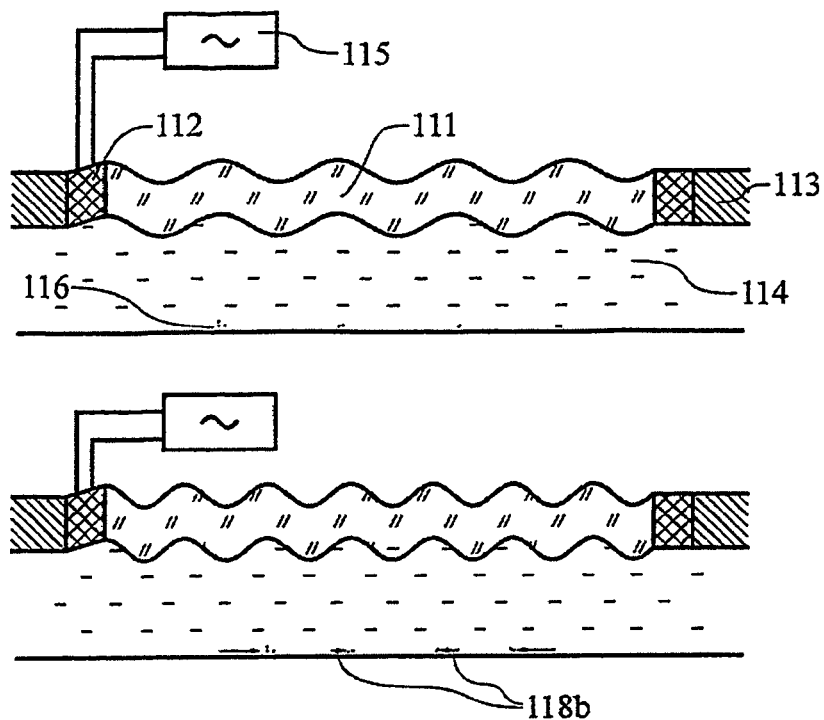
Figure 11C:
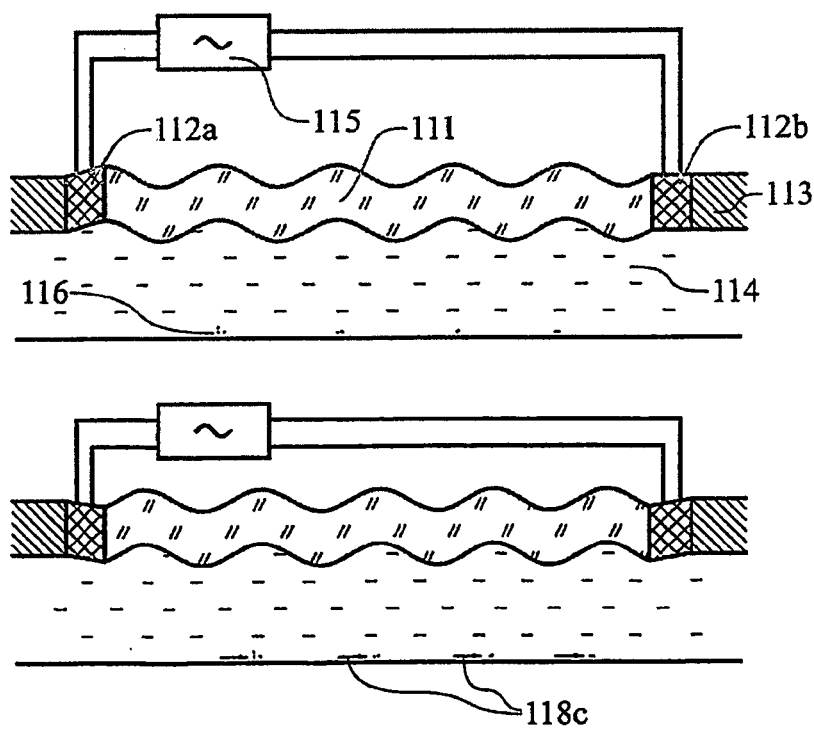

FIG. 11*a*, FIG. 11*b* and FIG. 11*c* show three possible displacement principles. This setup comprises a plate 111 excited to vibrations by one or more transducers 112, 112*a*, 122*b*, a mounting 113 that holds these components, a fluid 114 and a generator 115 to run the transducer(s) 112, 112*a*, 122*b*. On a surface particles 116 are located according to the force potential of the sound field in the fluid 114. Particles that levitate in the fluid 114 will be located analogously (not shown in the drawing). In the upper part of each drawing the initial state is displayed and in the lower the final state with the displaced particles. The displacement is illustrated with arrows 118*a*, 118*b*, 118*c*. A very simple method to displace particles is to move the mounting holding the vibrating plate 111 and the transducers 112 like displayed in FIG. 11*a*. According to this displacement 117 the particles, that maintain their relative positions to vibrating plate 111, will be moved simultaneously 118*a*. A second method shows FIG. 11*b*. First the plate 111 is excited with a resonance frequency. Then the plate 111 is exited with another e.g. higher resonance frequency and a vibration with an other e.g. smaller wavelength appears. Due to the smaller wavelength of plate vibration the particles are moved to other equilibrium positions on the surface 118*b*. By applying power with same or differing parameters like frequency, amplitude or phase to each of the multiple transducers 112*a*, 112*b* like in FIG. 11*c* the vibration mode of the plate 111 can be changed. The changes of the vibration mode occur due to modulation of the excitation signal. The particles 116 will follow these changing and will be moved 118*c*.

The preferred embodiment can be used for the optically controlled manipulation of small particles for instance with a microscope. When the vibrating plate 91, 101 or 111 is made of a transparent material like glass the particles can be observed while they are manipulated or positioned by one of the described methods. For example, the mounting can be connected to a two-dimensional translation stage that moves the mounting 94, 104 or 113.

Figure 12:
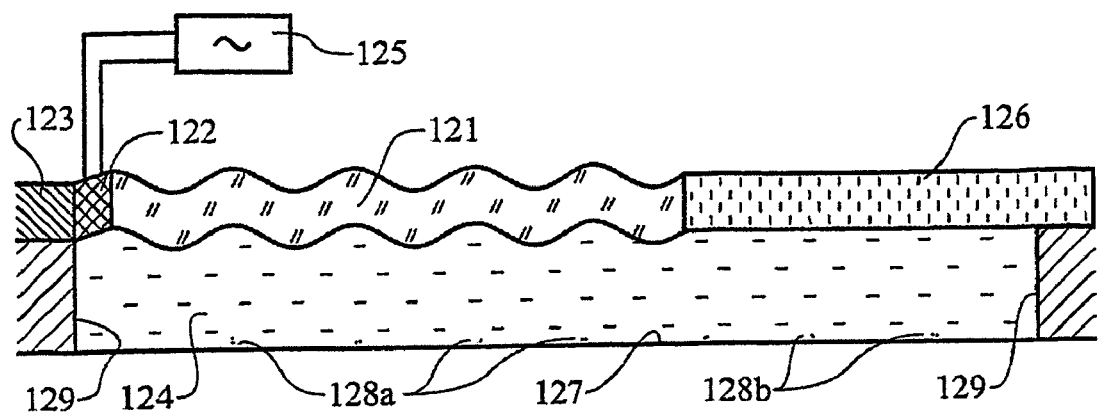
FIG. 12 shows how the principle can be used when the particles, that shall be positioned, are not placed under the vibrating body.

FIG. 12 shows how particles can be manipulated that are not located under the vibrating plate 121 or close to it. The sound field is build up in the entire volume that is filled by the fluid 124. In the example of FIG. 12 the sound waves are reflected by the reflecting surface 127, another boundary 129 and an arbitrary device 126. It is possible to manipulate the particles 128*b* under the device 126 although it is not vibrating. In FIG. 12 the case with a one-dimensional plate vibration is illustrated. It is also possible to implement the device analogous to FIG. 6*b* with a two-dimensional plate vibration.

To be able to move particles between the discrete positions where they are concentrated by the sound field it is possible to let the fluid flow temporarily. This should be coordinated with a variation of the sound field. In the upper illustration of FIG. 11*a* the fluid flow is represented by an arrow 119.

In FIG. 4 the equilibrium positions of particles in a sound field are marked with circles 43. However the equilibrium positions do not only depend on the sound field but also on the material properties of the fluid and particles. This can be used to separate particles. For two types of particles each having different material properties like density and speed of sound there exist a fluid with specific material properties so that these two types of particles are concentrated in different positions in the sound field, for example either in points marked with circle 43 or in points marked with plus-signs 47.

LIST OF REFERENCE NUMERALS

11 co-ordinate system, x-direction rightward, y-direction upward
12 solid body with a vibrating surface
13 fluid
14 vibrating surface
14*a* wave length of the surface movement
15 sound wave
15*a* wave length of the sound wave
15*b* radiation angle
21 co-ordinate system, x-direction rightward, y-direction upward
22 solid body with a vibrating surface, vibrating body
23 solid body with a rigid surface, reflecting body
24 height of the fluid gap
25 fluid
26 standing surface wave
27 standing two dimensional sound field
41 co-ordinate system, x-direction rightward, y-direction upward
42 displacement of the surface of a solid body at an arbitrary point of time, vibrating body
43 positions where light particles are collected
44 positions where light and heavy particles are collected
45 solid body with a rigid surface, reflecting body
46 force field, e.g. terrestrial gravitation
47 points where particles with other material properties are collected
51 plate, plate excited to vibrations, vibrating body
52 transducer
53 mounting
54 reflecting body
55 fluid 56 generator
57 particles arbitrarily distributed
58 particles concentrated due to the sound field
59 particles levitating in fluid due to the sound field
61 plate excited to vibrations, vibrating body
62 reflecting surface
63 mounting
64a transducer
64b transducer
65 propagation direction of the wave in the plate
66 edge where the plate wave is reflected
67 edge where the plate wave is reflected
71 plate excited to vibrations, vibrating body
72 reflecting surface
73 SAW-device
81 mounting
82 quadratic recess
83 vibrating plate with attached transducers
84 applied displacement
85 elongation due to the applied displacement
91 plate, vibrating body
92 transducer
93 mounting that holds the plate 91 and the transducer 92
94 mounting to move the vibrating plate
95 reflecting surface
96 fluid
101 plate, vibrating body
102 transducer
103 mounting that holds the plate 101 and the transducer 102
104 mounting to move the vibrating plate vertically
111 plate excited to vibrations, vibrating body
112 transducer
112a transducer
112b transducer
113 mounting
114 fluid
115 generator
116 particle concentrated due to the sound field
117 displacement of the mounting
118a displacement of the particles
118b displacement of the particles
118c displacement of the particles
119 possible fluid flow
121 plate excited to vibrations, vibrating body
122 transducer
123 mounting
124 fluid
125 generator
126 any arbitrary device
127 reflecting surface
128a particle positioned under the vibrating body
128b particle positioned distant from the vibrating body
129 boundaries of the fluid

We claim:

1. A method for controlled positioning of particles surrounded by a fluid using acoustic forces, which comprises the steps of:
providing a plate excited to vibrate as a body;
exciting the body with a transducer to produce bending vibrations of the body;
emitting acoustic waves into the fluid by a surface movement of the body; and
reflecting the acoustic waves off of a surface of other bodies for forming a sound field in which the acoustic forces appear;
the providing step providing a triangular plate as the plate excited to bending vibrations; and
the exciting step including exciting the triangular plate with the transducer being a single transducer so that plate waves are reflected by two edges of the triangular plate.

2. The method according to claim 1, wherein a distance between the triangular plate excited to vibrations and the other body that reflects said acoustic waves is adjustable.

3. A method for controlled positioning of particles surrounded by a fluid using acoustic forces, the method comprising the steps of:
exciting a body with a transducer at a first frequency to produce vibrations of the body and, then, exciting the body with the transducer at a second frequency different from the first frequency to produce vibrations of the body;
emitting acoustic waves into the fluid by a surface movement of the body; and
reflecting the acoustic waves off of a surface of other bodies for forming a sound field in which the acoustic forces appear.

4. The method according to claim 3, which further comprises providing a plate excited to vibrate as the body.

5. The method of claim 4, wherein the plate vibrates by bending.

6. A method for controlled positioning of particles surrounded by a liquid, using acoustic forces, the method comprising the steps of:
exciting a body with a transducer at a first frequency to produce vibrations of the body and, then, exciting the body with the transducer at a second frequency different from the first frequency to produce vibrations of the body;
emitting acoustic waves into the liquid by a surface movement of the body; and
reflecting the acoustic waves off of a surface of other bodies for forming a sound field in which the acoustic forces appear.

* * * * *